United States Patent [19]

Perrett

[11] Patent Number: 5,415,724
[45] Date of Patent: May 16, 1995

[54] HEAT SEALING ASSEMBLY FOR POUCH-MAKING PACKAGING MACHINES

[75] Inventor: Arnold E. Perrett, Whitby, Canada

[73] Assignee: Du Pont Canada Inc., Mississauga, Canada

[21] Appl. No.: 57,031

[22] Filed: May 5, 1993

[51] Int. Cl.⁶ .......................................... B29C 65/02
[52] U.S. Cl. .................. 156/583.2; 156/515; 156/581
[58] Field of Search .......... 156/583.1, 582.2, 515, 156/530, 581; 219/243; 53/373.7

[56] References Cited

U.S. PATENT DOCUMENTS

| | | | |
|---|---|---|---|
| 2,682,294 | 6/1954 | Langer | 156/583.2 X |
| 3,165,622 | 1/1965 | Marzec | 156/583.2 X |
| 3,334,005 | 8/1967 | Fener | 156/583.2 |
| 3,409,494 | 11/1968 | Korzinek | 156/515 |
| 3,859,159 | 1/1975 | Carter et al. | 156/583.2 X |
| 3,982,991 | 9/1976 | Hamm et al. | 156/515 |
| 4,055,456 | 10/1977 | Carnegie, Jr. | 156/583.2 X |
| 4,115,182 | 9/1978 | Wildmoser | 156/515 |
| 4,856,259 | 8/1989 | Woo et al. | 53/373 |

FOREIGN PATENT DOCUMENTS 8500293  9/1986  Netherlands ..................... 156/583.2

Primary Examiner—David A. Simmons
Assistant Examiner—J. Sells

[57] ABSTRACT

A heat sealing element and related self aligning support jaw, for sealing at least two layers of thermoplastic film is disclosed. It may be used with a vertical form, fill and seal machine for packaging flowable materials, e.g. chocolate fudge, sundae topping, in pouches. The heat sealing element has a spade end which extends from the electrical connection essentially to the edge of the thermoplastic film.

19 Claims, 4 Drawing Sheets

HEAT SEALING ASSEMBLY FOR POUCH-MAKING PACKAGING MACHINES

The invention relates to a heat sealing element and a related jaw assembly useful for making pouches filled with flowable materials, e.g. thick sauces and dressings, particularly to pouches made on so-called vertical form, fill and seal machines.

For many years, milk has been packaged in pouches made on vertical form, fill and seal machines. Such pouches have been sold to household consumers and, in use, such milk-filled pouches are stood within an open-mouthed pitcher. More recently, such pouches have been used to package other flowable comestibles, mayonnaise, caramel, scrambled eggs, tomato ketchup, chocolate fudge, salad dressings, preserves and the like. Pouches containing such comestibles are usually sold to "institutional" buyers, e.g. restaurants.

It is well known to package flowable materials, for example milk, mayonnaise and the like on so-called vertical form, fill and seal machines. Using one such a machine, a flat web of thermoplastic film is unwound from a roll and formed into a continuous tube in a tube forming section, by sealing the longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. After the jaws are closed and while the transverse seal is being made, a quantity of material to be packaged, e.g. liquid, is caused to enter the tube, at the filling station, and fill the tube upwardly from the aforementioned transverse seal. When the jaws are opened, the film tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device clamps, seals and severs the tube transversely at the second transverse section. The material-filled portion of the tube is now in the form of a pillow shaped pouch. Thus the sealing device has sealed the top of the filled pouch, sealed the bottom of the next-to-be formed pouch, all in one operation. One such vertical form and fill machine of the type described above is sold under the trade mark PREPAC. Other machines may be operated such that the material-to-be-packaged is caused to enter the tube continuously rather than intermittently as described above. As a result, sealing of the film takes place with material-to-be-packaged between the heat sealing surfaces in the film tube.

With some other machines, the sealing device does not sever the tube at the second transverse section, but does sever the tube subsequently. With yet other machines the jaws of the heat sealing device reciprocate up and down. With such machines, the jaws clamp, seal and sever the tube of film while moving in a downward direction, the jaws then open and return upwards in the open position. The downward movement of the closed jaws also serve to advance the tubular film downwardly.

The present invention relates to a heat sealing assembly for any of the above mentioned machines.

A sealing device commonly used is a so-called "impulse sealer" in which an electrical current flows through the sealing element for only a fraction of the cycle time between operations. The impulse sealer may be a round wire, e.g. a "piano" wire about 2.0 mm to 2.3 mm diameter, electrically insulated from a water-cooled supporting jaw. After the electrical impulse is fed to the impulse sealer, there is a cooling period in which the seals are "set" while the jaws remain closed. Round wire impulse sealers as described above, in combination with conventional flat faced heat sealing jaws, are satisfactory for form and fill machines when packaging liquids such as milk, water or other highly aqueous products. These liquids have relatively high thermal conductivities and thus aid in cooling of the seal after the sealing jaws are opened, i.e. the cooling effect of the liquid on the seal operates before the weight of the liquid can weaken or rupture the bottom seal. Sometimes, too, such liquids vaporize at temperatures below the sealing temperature of the sealing layer of the film and it is speculated that vaporization may aid in removing contamination from the seal area, i.e. the liquid may be "self voiding" from the seal area. Round wire impulse sealers are generally unsatisfactory on form, fill and seal machines when packaging thick flowable materials such as mayonnaise, chocolate fudge, scrambled egg mix, dressings, jams and the like. Other kinds of sealers are also known.

When using impulse sealers it is necessary to electrically insulate the heat sealing element from the metal jaw upon which it is mounted, and to provide partial thermal insulation from the jaw. This is most often accomplished by placing woven glass cloth impregnated with polytetrafluoroethylene between the jaw and the heat sealing element. As is known to those skilled in the art, the heat sealing element and the jaw are wider than the flattened film tube in order to allow room for adjustment of the transverse "tracking" of the tube. Furthermore, the heat sealing element extends beyond the edges of the jaws in order to permit securement of the ends of the element to an electrical terminal. Because of this arrangement, the heat sealing element tends to be hotter at the ends of the jaw where the element does not come in contact with the film. Consequently the woven glass fibre cloth is continually subjected to high heat without there being a heat sink to drain the heat away. Thus the woven glass cloth impregnated with polytetrafluoroethylene often becomes degraded or burnt relatively quickly and it is necessary to replace the woven glass fibre cloth at frequent intervals. Previous attempts to alleviate this problem have not been entirely successful and the present invention seeks to address this problem.

Additionally, previous jaw and element combinations often rely on skilled operators to properly position the element on the jaw, for consistently good performance of the element. For example, it is highly desirable for some elements, such as those which are V-shaped in cross-section, that the element be properly aligned along the entire length of the jaw and that the element makes uniform contact with the jaw, and with some element/jaw combinations this is difficult to achieve and may take an undesirable length of time to accomplish.

Accordingly, the present invention provides a heat sealing assembly, for sealing at least two layers of thermoplastic film, comprising first and second jaws, an electrical impulse heat sealing element, electrical terminals, and an electrical and thermal insulating material between the first jaw and the heat sealing element, said heat sealing element being removably connected to said electrical terminals, at least one of said jaws being capable of transverse motion and adapted to collapse a tubular film made from said thermoplastic film and passing between said jaws, wherein said element has at each end a flat piece of electrically conducting metal, wherein each flat end piece extends from a position adjacent to where the edge of the film tube is expected to pass to at least an end of the first jaw, each of said flat end pieces being adapted to connect with one of said electrical connectors in substantially the same position every time that it is connected thereto, said electrical terminals being adapted to keep said heat sealing element under tension between the electrical terminals when said element is connected thereto, and said electrical terminals also being adapted to release such tension and allow said element to be disconnected therefrom.

In one embodiment the flat end piece is substantially rectangular in shape.

In yet another embodiment the flat end piece is coated with copper.

In a further embodiment the heat sealing element is adapted to simultaneously seal and sever the film tube, and between the flat end pieces comprises an elongated ribbon with a raised strip at the centre and along the length of the ribbon.

In yet another embodiment the flat end pieces and the ribbon are made from a single piece of metal, and in which the ribbon is bent so that the ribbon comprises two flat end elongated fins adjoined by a segment of a tube, each lateral edge of said segment being adjoined to a lateral edge of one of the elongated fins.

In another embodiment the heat sealing element is made from a single piece of metal having a thickness of from 0.13 to 0.6 mm.

In a further embodiment the planes of said fins meet at an angle of from 170 to 145 degrees.

In yet another embodiment the heat sealing assembly has channels into which the flat end pieces fit snugly.

In yet another embodiment each of the electrical terminals are embedded in a block, each block is slidably connected to the jaw such that the blocks may move towards and away from each other, and tension in the element is effected by a tension spring which is biased to separate each block and the jaw.

A further aspect of the invention provides a jaw assembly for heat sealing thermoplastic films on a packaging machine, comprising a jaw, having a longitudinal axis, and two blocks, each block having an electrical terminal thereon, said electrical terminals being adapted to have a heat sealing element removably connected thereto, wherein said heat sealing element comprises an electrically conductive ribbon having at each end a flat end piece of electrically conducting metal, each of said blocks being adapted to receive a flat end piece of said heat sealing element in substantially the same position every time that such piece is connected thereto, each block being slidably connected to the jaw such that the blocks may move towards and away from each other in a direction parallel to the longitudinal axis of the jaw, each block also being associated with a tension spring which is biased to separate the block and the jaw said jaw and blocks being adapted to ensure that the element ribbon is parallel to the longitudinal axis of the jaw and is in close association with and electrically separated from a face of the jaw, said face being adapted to cooperate with a second jaw and heat seal a thermoplastic film therebetween.

DESCRIPTION OF THE DRAWINGS

Embodiments of the invention are illustrated in the accompanying drawings in which.

DESCRIPTION OF THE PREFERRED EMBODIMENTS

Figure 1:
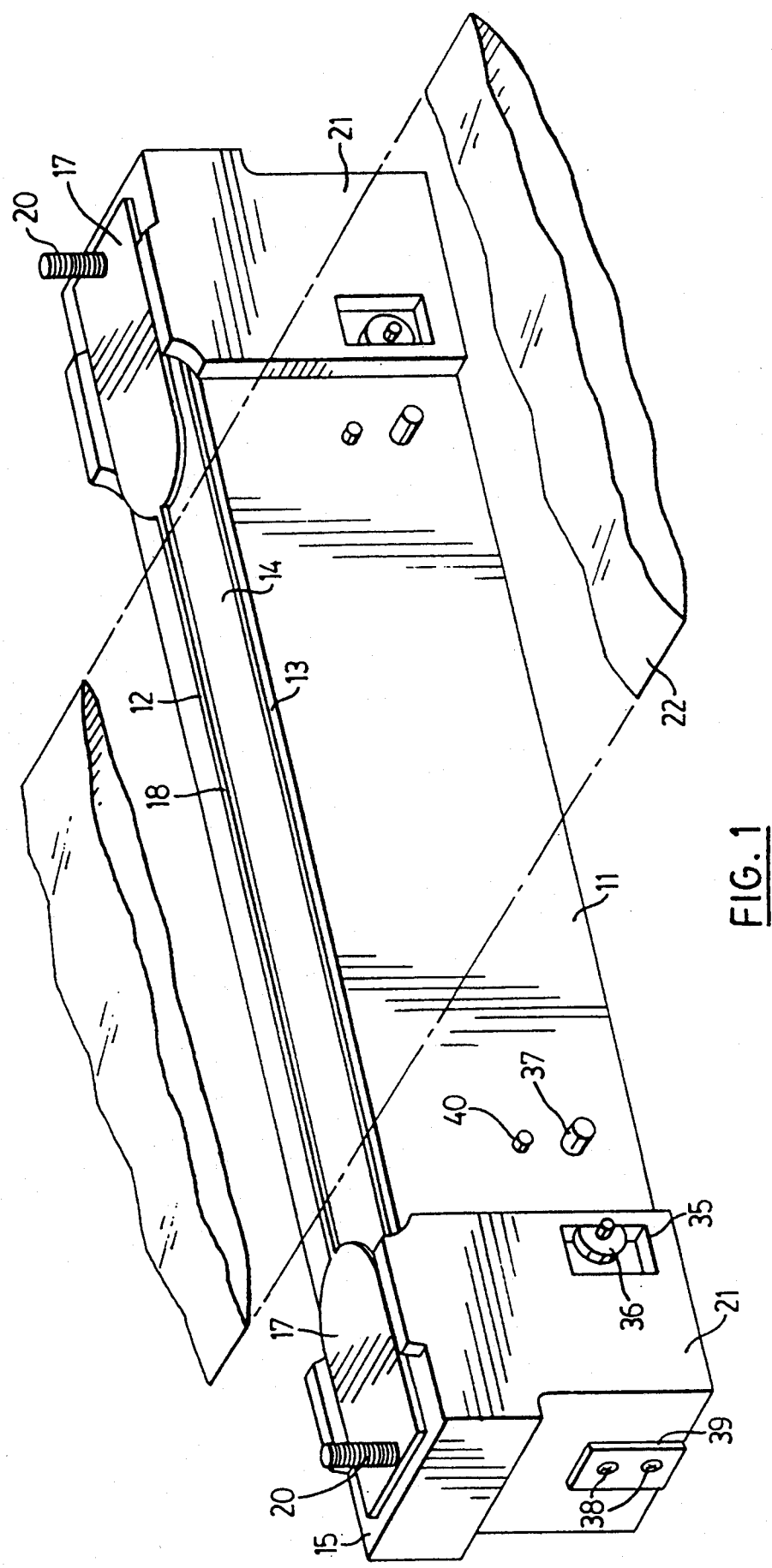
FIG. 1 shows a three quarter view of a preferred embodiment of the present invention.
Figure 4:
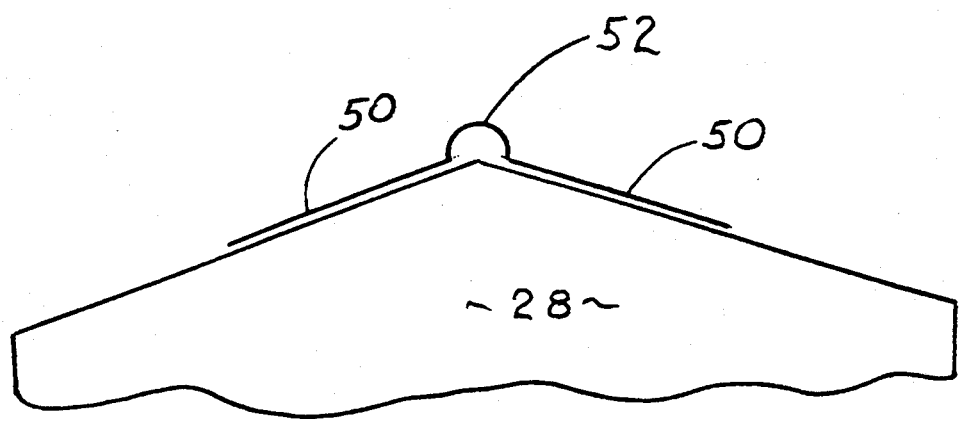
FIG. 4 shows a side elevational view of another embodiment of the heat sealing element.

FIG. 1 shows first heat sealing jaw 11 upon which is mounted a heat sealing element 12. The heat sealing assembly also has a cooperating second heat sealing jaw (not shown) which has a back-up heat resistant pad thereon (also not shown), which is known in the art. Both jaws are mounted on a form and fill machine (not shown) as is known in the art. At least one of the jaws may move reciprocally towards and away from the other. On face 13 of the first jaw is placed at least one layer of woven glass fibre cloth 14 impregnated with a polytetrafluoroethylene. It will be understood that such a cloth may be replaced by another heat resistant and electrically insulating material, either built into the jaw or sandwiched between face 13 and heat sealing element 12. At each end of jaw 11 there are blocks 21 made of electrically insulating material, e.g. an acetal resin. Blocks 21 have channels 15 therein which serve to support and guide the ends of heat sealing element 12. Blocks 21 are supported by guide rods (not shown), that allow the blocks to move parallel to the heat sealing element. The guide rods slide into bores 31 (FIG. 2) and are held in place by screws 38 in tie plate 39. Blocks 21 each have a compression spring (not shown), which fit into corresponding bores 34 (FIG. 2) and which serve to keep the heat seal element 12 under tension both during and after the heat sealing cycle. Heat sealing element 12 comprises substantially rectangular metal pieces or flat ends 17 and ribbon 18. In the embodiment shown in FIG. 4 the element comprises two flat elongated fins 50 of metal adjoined by a arcuate elongated segment of metal 52, each lateral edge of the elongated segment being adjoined to a lateral edge of one of the elongated fins, wherein the planes of the fins meet at an angle of from 125 to 170 degrees, said segment being on the excluded angle side of the planes. Flat end pieces 17 have holes therein for attaching to electrical terminals 20. The flat end pieces 17 of the heat sealing element 12 are electrodeposited or metal arc sprayed with a layer of conductive material, e.g. copper, for better electrical conductivity in order to minimize heat generation due to the electrical resistance of the flat end pieces. Sometimes it may also be desirable to extend the layer of conductive material onto the ribbon adjacent to the flat end pieces 17 so that parts of the ribbon not in contact with film 22 are not unduly heated. A further layer of woven glass fibre cloth impregnated with polytetrafluoroethylene (not shown) is placed over ribbon 18. This woven cloth acts primarily to prevent sticking and burning of the thermoplastic film which, but for the cloth, would come into contact with heat sealing element 12. It will be understood that other elements may be used, for example one with a wire spot welded to a ribbon.

Figure 2:
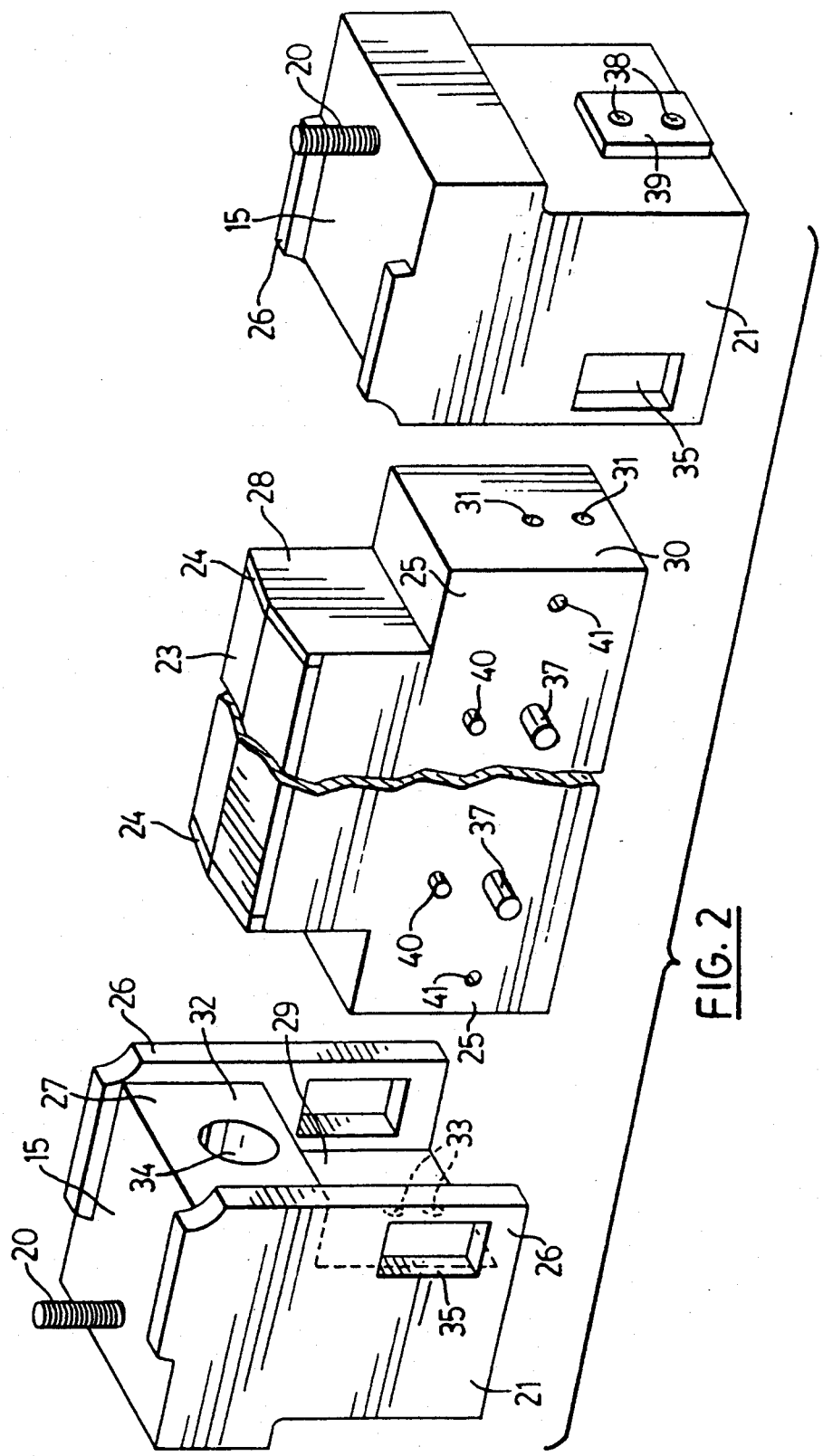
FIG. 2 shows an exploded view of an assembly useful in the present invention and an associated jaw and FIGS. 3a and 3b are side views of a block, showing positions of a cam used to relieve spring tension on the heat sealing element. Such spring tension relief permits easy replacement of heat sealing elements.
Figure 3A:
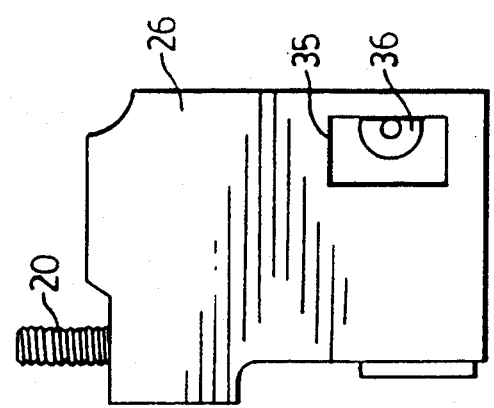
Figure 3B:
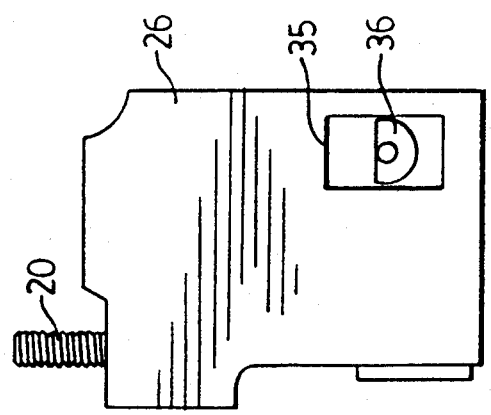

FIG. 2 shows the cooperation of the block 21 with jaw 11 in more detail. Jaw 11 has a top face 23 which is shaped like an inverted V in cross-section. Top face 23 is adapted to conform to the V-shape of a heat sealing ribbon (not shown). The end of face 23, adjacent to block 21, may have an electrically and thermally non-conductive segment 24 attached thereto. The end of jaw 11 is stepped to form tongue 25 and riser face 28. Tongue 25 has two blind bores 31 in face 30, which are adapted to receive guide rods (not shown) that serve to support and guide block 21. The guide rods slide into bores 31 (FIG. 2) and are held in place by screws 38 in tie plate 39. Block 21 is a single block of material and has a stepped block 27 sandwiched between sides or wings 26. Stepped block 27 has face 32 which is adapted to be close to, but not touch, riser face 28 of jaw 11, and also has face 29 which is adapted to be close to, but not touch, face 30 of tongue 25. Face 29 has two through bores 33 which are adapted to align with bores 31 and to receive the same rods which enter bores 31. As indicated hereinabove, the rods are connected to and held in place by screws 38 and tie plate 39. Face 32 has a blind bore 34 which is adapted to receive a spring (not shown). The spring presses against the blind end of bore 34 and against riser face 28 when the jaw 11 and block 21 are assembled. Each wing 26 has an aperture 35 therein which is adapted to receive a cam 36 (not shown in FIG. 2 but shown in FIGS. 3a and 3b). Cam 36 is mounted on a shaft (not shown) which passes through bore 41 in jaw 11. The purpose of cam 36 is two-fold. Firstly, in the position shown in FIG. 3a the semicircular portion of the cam slides over the edge of aperture 35, causing the spring to compress and thus bring the block and jaw closer together. This permits the holes in flat ends 17 of heat sealing element 12 to be placed easily over terminals 20. Secondly, when cam 36 is rotated to the position shown in FIG. 3b, the tension on the spring (not shown) is released. Cam 36 is connected to a cam lever (not shown), which facilitates the rotation of cam 36. In order to hold cam 36 in the correct position, as in FIG. 3, the cam lever is rotated until it hits stop 37. The cam lever is held in position by detent device 40. The heat sealing element 12 is then put under tension sufficient to keep ribbon 18 taut during the heating, sealing and cooling cycles. It will be understood by those skilled in the art that the block, if metal, will require various inserts of electrically insulative materials to ensure that there are not any electrical shorts between blocks 21 and jaw 11. In order to ensure that there is proper alignment of the jaw and blocks the guide rods (not shown) are inserted into through bores 33 and blind bore 31 and are positioned by tie plate 39. Inside faces 26 of block 21 are made to have clearance from tongue 25, to reduce frictional drag. If the blocks 21 are made of an electrically conductive material, the clearance also avoids electrical shorts.

It will be understood by those skilled in the art that modifications may be made to the blocks and jaw without departing from the spirit of the invention.

I claim:

1. A heat sealing assembly, for sealing at least two layers of thermoplastic film, comprising first and second jaws, an electrical impulse heat sealing element, electrical terminals, and an electrical and thermal insulating material between the first jaw and the heat sealing element, said heat sealing element being removably connected to said electrical terminals, at least one of said jaws being capable of transverse motion and adapted to collapse a tubular film made from said thermoplastic film and passing between said jaws, wherein said element has at each end a flat piece of electrically conducting metal, wherein each flat end piece extends from a position adjacent to where the edge of the film tube is expected to pass to at least an end of the first jaw, each of said flat end pieces being adapted to connect with one of said electrical connectors in substantially the same position every time that it is connected thereto, slidable lockable means associated with said electrical terminals to lock said heat sealing element under tension between the electrical terminals when said element is connected thereto, and to release said tension and allow said element to be disconnected therefrom.

2. A heat sealing assembly according to claim 1 wherein the end piece is substantially rectangular in shape.

3. A heat sealing assembly according to claim 1 wherein the end piece coated with an electrically conductive material.

4. A heat sealing assembly according to claim 3 wherein the electrically conductive material is copper.

5. A heat sealing assembly according to claim 1 which is adapted to simultaneously seal and sever the film tube, and between the flat end pieces comprises an elongated ribbon with a raised strip at the centre and along the length of the ribbon.

6. A heat sealing assembly according to claim 1 wherein the metal pieces and the ribbon are made from a single piece of metal, and in which the ribbon is bent so that the ribbon comprises two flat end elongated fins adjoined by a segment of a tube, each lateral edge of said segment being adjoined to a lateral edge of one of the elongated fins.

7. A heat sealing assembly according to claim 6 wherein the planes of said fins meet at an angle of from 170 to 145 degrees.

8. A heat sealing assembly according to claim 1 wherein the heat sealing assembly has channels into which the flat end pieces fit snugly.

9. A jaw assembly for heat sealing thermoplastic films on a packaging machine, comprising a jaw, having a longitudinal axis, and two blocks, each block having an electrical terminal thereon, said electrical terminals being adapted to have a heat sealing element removably connected thereto, wherein said heat sealing element comprises an electrically conductive ribbon having at each end a flat end piece of electrically conducting metal, each of said blocks being adapted to receive said flat end piece of said heat sealing elements in substantially the same position every time that such piece is connected thereto, each block being slidably connected to the jaw such that the blocks may move towards and away from each other in a direction parallel to the longitudinal axis of the jaw, each block also being associated with a tension spring which is biased to separate the block and the jaw, slidable lockable means associated with said blocks for moving said blocks and terminals closer together in a first position for replacing said heat sealing element and moving said blocks and terminals apart in a second position to lockingly ensure that said element ribbon is parallel to said longitudinal axis of the jaw and in close association with and electrically separated from a face of the jaw, said face being adapted to co-operate with a second jaw and heat seal a thermoplastic film therebetween.

10. A jaw assembly for heat sealing thermoplastic film comprising:
 (a) a pair of spaced electrical terminals;
 (b) a jaw extending to between said terminals;
 (c) a heat sealing element extending longitudinally so as to present two opposite ends removably securable to said spaced electrical terminals respectively;
 (d) biasing means for urging said terminals apart;
 (e) slidable lockable means associated with at least one of said terminals for:
  (i) moving said terminals closer together in a first position for replacing said heat sealing element from said terminals;
  (ii) moving said terminals apart in a second position for properly positioning and locking said heat sealing element relative said terminals and jaw.

11. A jaw assembly as claimed in claim 10 wherein said jaw extends along a longitudinal direction to present opposite ends and said jaw assembly further presenting a pair of spaced apart blocks presenting said pair of spaced apart terminals respectively, said blocks slidably connected to said ends of said jaw for slidable movement along said longitudinal direction.

12. A jaw assembly as claimed in claim 10 wherein said bracing means comprises a spring disposed between each said ends of said jaw and said blocks for urging said terminals apart.

13. A jaw assembly as claimed in claim 11 wherein said slidable lockable means comprises cam means associated with said blocks for:
 (a) compressing said springs and moving said blocks and said terminals closer together in a first position for replacing said heat sealing element from said terminals; and
 (b) for releasing said compression of said springs in a second position and moving said blocks and terminals apart in a second position for properly positioning and locking said heat sealing element relative said terminals and jaw.

14. A jaw assembly as claimed in claim 13 wherein each said end of said jaw presents a tongue adapted to be received by said blocks respectively.

15. A jaw assembly as claimed in claim 13 wherein each said block presents apertures engageable with said cam means.

16. A jaw assembly as claimed in claim 13 wherein each said block presents wings presenting said aperture means.

17. A jaw assembly as claimed in claim 13 wherein said cam means presents a semicircular position for engaging said aperture in said first position, and a flat position for engaging said aperture in said second position.

18. A jaw assembly as claimed in claim 13 wherein said heat sealing element presents flat ends presenting holes for receiving said terminals.

19. A heat sealing assembly as claimed in claim 1 wherein said slidable lockable means comprise cam means.

* * * * *